US011559450B2

(12) United States Patent
Desaulniers (10) Patent No.: US 11,559,450 B2
(45) Date of Patent: Jan. 24, 2023

(54) PATIENT SUPPORT APPARATUS USER INTERFACES

(71) Applicant: Stryker Corporation, Kalamazoo, MI (US)

(72) Inventor: Annie Desaulniers, Bothell, WA (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/455,038

(22) Filed: Nov. 16, 2021

(65) Prior Publication Data

US 2022/0071823 A1 Mar. 10, 2022

Related U.S. Application Data

(63) Continuation of application No. 16/020,003, filed on Jun. 27, 2018, now Pat. No. 11,202,729.

(Continued)

(51) Int. Cl.
*A61G 7/018* (2006.01)
*A61G 7/012* (2006.01)
(Continued)

(52) U.S. Cl.
CPC ............. *A61G 7/018* (2013.01); *A61G 7/012* (2013.01); *A61G 13/02* (2013.01); *A61G 13/06* (2013.01);
(Continued)

(58) Field of Classification Search
CPC ........ A61G 7/002; A61G 7/012; A61G 7/018; A61G 13/02; A61G 13/06
(Continued)

(56) References Cited

U.S. PATENT DOCUMENTS 5,113,214 A 5/1992 Nagata et al.
5,276,432 A 1/1994 Travis
(Continued)

FOREIGN PATENT DOCUMENTS

CN 101789230 A 7/2010
DE 19505162 C1 3/1996
(Continued)

OTHER PUBLICATIONS

Apple, "Adjust the Brightness on you iPhone, IPad, or IPod Touch", https://support.apple.com/en-us/HT202613, 2018, 2 pages.
(Continued)

*Primary Examiner* — Robert G Santos
(74) *Attorney, Agent, or Firm* — Howard & Howard Attorneys PLLC (57) ABSTRACT

A patient support apparatus comprising a patient support deck operatively attached to a base with a lift mechanism interposed between the base and the patient support deck to move the patient support deck between first and second vertical configurations relative to the base. A user interface configured to operate the patient support apparatus is provided and comprises a screen configured to display visual content in first and second content layouts. The screen is coupled to the patient support deck for concurrent movement between the vertical configurations A controller disposed in communication with the screen and the lift mechanism is configured to display the visual content in the first content layout when the patient support deck is in the first vertical configuration, and further configured to display the visual content in the second interface layout when the patient support deck is in the second vertical configuration.

14 Claims, 7 Drawing Sheets

Related U.S. Application Data (60) Provisional application No. 62/525,373, filed on Jun. 27, 2017.

(51) Int. Cl.
  *A61G 13/02*  (2006.01)
  *A61G 13/06*  (2006.01)
  *G06F 3/0482* (2013.01)

(52) U.S. Cl.
  CPC ........ *G06F 3/0482* (2013.01); *A61G 2203/16* (2013.01); *A61G 2203/20* (2013.01); *A61G 2203/40* (2013.01)

(58) Field of Classification Search
  USPC .............................................. 5/611, 600, 11
  See application file for complete search history.

(56) References Cited

U.S. PATENT DOCUMENTS

| | | |
|---|---|---|
| 5,434,621 A | 7/1995 | Yu |
| 5,640,953 A | 6/1997 | Bishop et al. |
| 5,645,667 A | 7/1997 | Kusen |
| 5,664,270 A | 9/1997 | Bell et al. |
| 5,971,913 A | 10/1999 | Newkirk et al. |
| 6,320,510 B2 | 11/2001 | Menkedick et al. |
| 6,340,977 B1 | 1/2002 | Lui et al. |
| 6,351,678 B1 | 2/2002 | Borders |
| 6,362,725 B1 | 3/2002 | Ulrich et al. |
| 6,396,224 B1 | 5/2002 | Luff et al. |
| 6,560,492 B2 | 5/2003 | Borders |
| 6,702,314 B1 | 3/2004 | Crose |
| 6,876,303 B2 | 4/2005 | Reeder et al. |
| 6,948,592 B2 | 9/2005 | Kavounas |
| 7,017,208 B2 | 3/2006 | Weismiller et al. |
| 7,038,588 B2 | 5/2006 | Boone et al. |
| 7,154,397 B2 | 12/2006 | Zerhusen et al. |
| 7,296,312 B2 | 11/2007 | Menkedick et al. |
| 7,319,386 B2 | 1/2008 | Collins, Jr. et al. |
| 7,336,187 B2 | 2/2008 | Hubbard, Jr. et al. |
| 7,389,552 B1 | 6/2008 | Reed et al. |
| 7,443,302 B2 | 10/2008 | Reeder et al. |
| 7,472,439 B2 | 1/2009 | Lemire et al. |
| 7,487,562 B2 | 2/2009 | Frondorf et al. |
| 7,490,021 B2 | 2/2009 | Holland et al. |
| 7,557,718 B2 | 7/2009 | Petrosenko et al. |
| 7,570,152 B2 | 8/2009 | Smith et al. |
| 7,690,059 B2 | 4/2010 | Lemire et al. |
| 7,702,481 B2 | 4/2010 | Dionne et al. |
| 7,747,644 B1 | 6/2010 | Reihl et al. |
| 7,888,901 B2 | 2/2011 | Larson et al. |
| 7,895,519 B1 | 2/2011 | Allegrezza et al. |
| 7,911,349 B2 | 3/2011 | Zerhusen et al. |
| 7,945,452 B2 | 5/2011 | Fathallah et al. |
| 7,973,666 B2 | 7/2011 | Petrosenko et al. |
| 8,069,157 B2 | 11/2011 | Jam |
| 8,117,701 B2 | 2/2012 | Bobey et al. |
| 8,121,856 B2 | 2/2012 | Huster et al. |
| 8,143,846 B2 | 3/2012 | Herman et al. |
| 8,165,908 B2 | 4/2012 | Bolle et al. |
| 8,209,608 B1 | 6/2012 | Linyard et al. |
| 8,266,742 B2 | 9/2012 | Andrienko |
| 8,308,237 B2 | 11/2012 | Kunou |
| 8,319,633 B2 | 11/2012 | Becker et al. |
| 8,334,779 B2 | 12/2012 | Zerhusen et al. |
| 8,341,777 B2 | 1/2013 | Hensley et al. |
| 8,344,860 B2 | 1/2013 | Collins, Jr. et al. |
| 8,410,943 B2 | 4/2013 | Metz et al. |
| 8,413,270 B2 | 4/2013 | Turner et al. |
| 8,413,271 B2 | 4/2013 | Blanchard et al. |
| 8,413,273 B2 | 4/2013 | Hornbach et al. |
| 8,432,287 B2 | 4/2013 | O'Keefe et al. |
| 8,442,738 B2 | 5/2013 | Patmore |
| 8,442,843 B2 | 5/2013 | Kneuer et al. |
| 8,464,380 B2 | 6/2013 | Bobey et al. |
| 8,525,682 B2 | 9/2013 | Dixon et al. |
| 8,544,126 B2 | 10/2013 | Elliott et al. |
| 8,552,880 B2 | 10/2013 | Kopp et al. |
| 8,566,118 B2 | 10/2013 | Kneuer et al. |
| 8,572,778 B2 | 11/2013 | Newkirk et al. |
| 8,604,917 B2 | 12/2013 | Collins et al. |
| 8,606,600 B2 | 12/2013 | Kneuer et al. |
| 8,641,301 B2 | 2/2014 | Yang et al. |
| 8,650,682 B2 | 2/2014 | Herman |
| 8,674,839 B2 | 3/2014 | Zerhusen et al. |
| 8,689,376 B2 | 4/2014 | Becker et al. |
| 8,706,527 B2 | 4/2014 | Kneuer et al. |
| 8,716,941 B2 | 5/2014 | Kim |
| 8,752,220 B2 | 6/2014 | Soderberg et al. |
| 8,756,078 B2 | 6/2014 | Collins, Jr. et al. |
| 8,768,520 B2 | 7/2014 | Oexman et al. |
| 8,789,102 B2 | 7/2014 | Pickelsimer et al. |
| 8,789,222 B2 | 7/2014 | Blanchard et al. |
| 8,844,078 B2 | 9/2014 | Hornbach et al. |
| 8,847,756 B2 | 9/2014 | Tallent et al. |
| 8,866,598 B2 | 10/2014 | Collins, Jr. et al. |
| 8,868,542 B2 | 10/2014 | Kimball et al. |
| 8,870,812 B2 | 10/2014 | Alberti et al. |
| 8,896,524 B2 | 11/2014 | Birnbaum et al. |
| 8,923,994 B2 | 12/2014 | Laikari et al. |
| 8,924,218 B2 | 12/2014 | Corpier et al. |
| 8,926,535 B2 | 1/2015 | Rawls-Meehan |
| 8,984,685 B2 | 3/2015 | Robertson et al. |
| 9,001,038 B2 | 4/2015 | Kasahara |
| 9,032,510 B2 | 5/2015 | Sampathkumaran et al. |
| 9,038,217 B2 | 5/2015 | Elliot et al. |
| 9,050,031 B2 | 6/2015 | Collins, Jr. et al. |
| 9,088,282 B2 | 7/2015 | Holenarsipur et al. |
| 9,104,789 B2 | 8/2015 | Gross et al. |
| 9,126,571 B2 | 9/2015 | Lemire et al. |
| 9,138,173 B2 | 9/2015 | Penninger et al. |
| 9,173,792 B2 | 11/2015 | Goffer |
| 9,186,113 B2 | 11/2015 | Harper et al. |
| 9,204,823 B2 | 12/2015 | Derenne et al. |
| 9,220,650 B2 | 12/2015 | Bobey et al. |
| 9,228,885 B2 | 1/2016 | Zerhusen et al. |
| 9,230,421 B2 | 1/2016 | Reeder et al. |
| 9,233,033 B2 | 1/2016 | Valentino et al. |
| 9,233,038 B2 | 1/2016 | Gibson et al. |
| 9,259,369 B2 | 2/2016 | Derenne et al. |
| 9,262,876 B2 | 2/2016 | Wood et al. |
| 9,320,664 B2 | 4/2016 | Newkirk et al. |
| 9,336,672 B2 | 5/2016 | Collins, Jr. et al. |
| 9,342,677 B2 | 5/2016 | Ali et al. |
| 9,358,168 B2 | 6/2016 | Williamson et al. |
| 9,381,125 B2 | 7/2016 | Herbst et al. |
| 9,424,699 B2 | 8/2016 | Kusens et al. |
| 9,456,938 B2 | 10/2016 | Blickensderfer et al. |
| 9,463,126 B2 | 10/2016 | Zerhusen et al. |
| 9,466,163 B2 | 10/2016 | Kusens et al. |
| 9,480,435 B2 | 11/2016 | Olsen |
| 9,486,084 B2 | 11/2016 | Connell et al. |
| 9,492,341 B2 | 11/2016 | Huster et al. |
| 9,569,591 B2 | 2/2017 | Vanderpohl, III |
| 9,593,833 B2 | 3/2017 | McMannon et al. |
| 9,613,445 B2 | 4/2017 | Gilger et al. |
| 9,618,383 B2 | 4/2017 | Zerhusen et al. |
| 9,655,798 B2 | 5/2017 | Zerhusen et al. |
| 9,691,206 B2 | 6/2017 | Kusens et al. |
| 9,774,991 B2 | 9/2017 | Kusens |
| 9,782,005 B2 | 10/2017 | Paul et al. |
| 9,814,410 B2 | 11/2017 | Kostic et al. |
| 9,838,849 B2 | 12/2017 | Kusens |
| 9,844,275 B2 | 12/2017 | Nunn et al. |
| 9,849,051 B2 | 12/2017 | Newkirk et al. |
| 9,858,741 B2 | 1/2018 | Kusens et al. |
| 9,861,321 B2 | 1/2018 | Collins, Jr. et al. |
| 9,892,310 B2 | 2/2018 | Kusens et al. |
| 9,892,311 B2 | 2/2018 | Kusens et al. |
| 9,916,649 B1 | 3/2018 | Kusens |
| 9,934,427 B2 | 4/2018 | Derenne et al. |
| 9,940,810 B2 | 4/2018 | Derenne et al. |
| 9,984,521 B1 | 5/2018 | Kusens et al. |
| 9,998,857 B2 | 6/2018 | Kusens |

(56) References Cited

U.S. PATENT DOCUMENTS

| | | |
|---|---|---|
| 9,999,555 B2 | 6/2018 | Magill et al. |
| 10,004,654 B2 | 6/2018 | Zerhusen et al. |
| 10,034,979 B2 | 7/2018 | Bechtel et al. |
| 10,052,249 B2 | 8/2018 | Elliott et al. |
| 10,098,796 B2 | 10/2018 | Valentino et al. |
| 10,136,841 B2 | 11/2018 | Alghazi |
| 10,172,752 B2 | 1/2019 | Goffer |
| 10,176,608 B2 | 1/2019 | Gilger et al. |
| 10,188,569 B2 | 1/2019 | Elku et al. |
| 10,363,181 B2 | 7/2019 | Williamson et al. |
| 10,391,008 B2 | 8/2019 | Zerhusen et al. |
| 10,420,688 B2 | 9/2019 | Furman et al. |
| 10,561,552 B2 | 2/2020 | Newkirk et al. |
| 11,096,850 B2 * | 8/2021 | Bhimavarapu ........ A61G 7/018 |
| 11,160,514 B2 | 11/2021 | Nahavandi et al. |
| 11,202,729 B2 | 12/2021 | Desaulniers |
| 11,246,776 B2 | 2/2022 | Moreno et al. |
| 11,484,451 B1 * | 11/2022 | Nahavandi ............ A61G 7/005 |
| 2002/0014951 A1 | 2/2002 | Kramer et al. |
| 2003/0183427 A1 | 10/2003 | Tojo et al. |
| 2004/0083394 A1 | 4/2004 | Brebner et al. |
| 2006/0077186 A1 | 4/2006 | Park et al. |
| 2006/0101581 A1 | 5/2006 | Blanchard et al. |
| 2006/0102392 A1 | 5/2006 | Johnson et al. |
| 2007/0163045 A1 | 7/2007 | Becker et al. |
| 2007/0219950 A1 | 9/2007 | Crawford |
| 2008/0141459 A1 | 6/2008 | Hamberg et al. |
| 2008/0172789 A1 | 7/2008 | Elliot et al. |
| 2008/0235872 A1 | 10/2008 | Newkirk et al. |
| 2009/0153370 A1 | 6/2009 | Cooper et al. |
| 2010/0039414 A1 | 2/2010 | Bell |
| 2010/0212087 A1 | 8/2010 | Leib et al. |
| 2011/0080421 A1 | 4/2011 | Capener |
| 2011/0144548 A1 | 6/2011 | Elliott et al. |
| 2011/0162067 A1 | 6/2011 | Shuart et al. |
| 2011/0169653 A1 | 7/2011 | Wang et al. |
| 2011/0214234 A1 | 9/2011 | Herman |
| 2012/0023670 A1 | 2/2012 | Zerhusen et al. |
| 2012/0089419 A1 | 4/2012 | Huster et al. |
| 2012/0124744 A1 | 5/2012 | Hornbach et al. |
| 2012/0137436 A1 | 6/2012 | Andrienko |
| 2012/0215360 A1 | 8/2012 | Zerhusen et al. |
| 2012/0239173 A1 | 9/2012 | Laikari et al. |
| 2013/0096701 A1 | 4/2013 | Suorajaervi et al. |
| 2013/0138452 A1 | 5/2013 | Cork et al. |
| 2013/0142367 A1 | 6/2013 | Berry et al. |
| 2013/0219622 A1 | 8/2013 | Hornbach et al. |
| 2013/0227787 A1 | 9/2013 | Herbst et al. |
| 2013/0238991 A1 | 9/2013 | Jung et al. |
| 2013/0300867 A1 | 11/2013 | Yoder |
| 2013/0318716 A1 | 12/2013 | Vanderpohl, III |
| 2014/0076644 A1 | 3/2014 | Derenne et al. |
| 2014/0137025 A1 | 5/2014 | Newkirk et al. |
| 2014/0259410 A1 | 9/2014 | Zerhusen et al. |
| 2014/0265181 A1 | 9/2014 | Lambarth et al. |
| 2014/0297327 A1 | 10/2014 | Heil et al. |
| 2014/0313700 A1 | 10/2014 | Connell et al. |
| 2014/0342330 A1 | 11/2014 | Freeman et al. |
| 2015/0002393 A1 | 1/2015 | Cohen et al. |
| 2015/0060162 A1 | 3/2015 | Goffer |
| 2015/0077534 A1 | 3/2015 | Derenne et al. |
| 2015/0109442 A1 | 4/2015 | Derenne et al. |
| 2015/0154002 A1 | 6/2015 | Weinstein et al. |
| 2015/0250669 A1 | 9/2015 | Elliott et al. |
| 2015/0317068 A1 | 11/2015 | Marka et al. |
| 2016/0012218 A1 | 1/2016 | Perna et al. |
| 2016/0022039 A1 | 1/2016 | Paul et al. |
| 2016/0038361 A1 | 2/2016 | Bhimavarapu et al. |
| 2016/0045382 A1 | 2/2016 | Goffer |
| 2016/0049028 A1 | 2/2016 | Kusens et al. |
| 2016/0050217 A1 | 2/2016 | Mare et al. |
| 2016/0065909 A1 | 3/2016 | Derenne et al. |
| 2016/0095774 A1 | 4/2016 | Bobey et al. |
| 2016/0140307 A1 | 5/2016 | Brosnan et al. |
| 2016/0180668 A1 | 6/2016 | Kusens et al. |
| 2016/0183864 A1 | 6/2016 | Kusens et al. |
| 2016/0193095 A1 | 7/2016 | Roussy et al. |
| 2016/0199240 A1 | 7/2016 | Newkirk et al. |
| 2016/0247342 A1 | 8/2016 | Kusens et al. |
| 2016/0296396 A1 | 10/2016 | Kolar et al. |
| 2016/0324705 A1 | 11/2016 | Bach Castillo |
| 2016/0338891 A1 | 11/2016 | Agdeppa et al. |
| 2016/0366327 A1 | 12/2016 | Kusens |
| 2016/0367420 A1 | 12/2016 | Zerhusen et al. |
| 2016/0371786 A1 | 12/2016 | Kusens et al. |
| 2017/0027787 A1 | 2/2017 | Huster et al. |
| 2017/0027789 A1 | 2/2017 | St.John et al. |
| 2017/0049642 A9 | 2/2017 | Valentino et al. |
| 2017/0055113 A1 | 2/2017 | Kusens |
| 2017/0076526 A1 | 3/2017 | Kusens et al. |
| 2017/0094477 A1 | 3/2017 | Kusens et al. |
| 2017/0097800 A1 | 4/2017 | Vanderpohl, III |
| 2017/0098048 A1 | 4/2017 | Brosnan et al. |
| 2017/0109770 A1 | 4/2017 | Kusens et al. |
| 2017/0111770 A1 | 4/2017 | Kusens |
| 2017/0116790 A1 | 4/2017 | Kusens et al. |
| 2017/0124844 A1 | 5/2017 | Huster et al. |
| 2017/0128296 A1 | 5/2017 | Kostic et al. |
| 2017/0143565 A1 | 5/2017 | Childs et al. |
| 2017/0193177 A1 | 7/2017 | Kusens |
| 2017/0193180 A1 | 7/2017 | Kusens et al. |
| 2017/0193279 A1 | 7/2017 | Kusens et al. |
| 2017/0193772 A1 | 7/2017 | Kusens et al. |
| 2017/0195637 A1 | 7/2017 | Kusens et al. |
| 2017/0213445 A1 | 7/2017 | Kusens |
| 2017/0224562 A1 | 8/2017 | Zerhusen et al. |
| 2017/0229009 A1 | 8/2017 | Foster et al. |
| 2017/0259811 A1 | 9/2017 | Coulter et al. |
| 2017/0281440 A1 | 10/2017 | Puvogel et al. |
| 2017/0352212 A1 | 12/2017 | Kusens et al. |
| 2018/0008052 A1 | 1/2018 | Krickeberg et al. |
| 2018/0017945 A1 | 1/2018 | Sidhu et al. |
| 2018/0039743 A1 | 2/2018 | Dixon et al. |
| 2018/0040091 A1 | 2/2018 | Kusens |
| 2018/0041864 A1 | 2/2018 | Kusens |
| 2018/0055418 A1 | 3/2018 | Kostic et al. |
| 2018/0056985 A1 | 3/2018 | Coulter et al. |
| 2018/0084390 A1 | 3/2018 | Kusens |
| 2018/0096550 A1 | 4/2018 | Kusens et al. |
| 2018/0104122 A9 | 4/2018 | Elliott et al. |
| 2018/0104123 A1 | 4/2018 | Newkirk et al. |
| 2018/0110445 A1 | 4/2018 | Bhimavarapu et al. |
| 2018/0114053 A1 | 4/2018 | Kusens et al. |
| 2018/0137340 A1 | 5/2018 | Kusens et al. |
| 2018/0151010 A1 | 5/2018 | Kusens et al. |
| 2018/0161225 A1 | 6/2018 | Zerhusen et al. |
| 2018/0167816 A1 | 6/2018 | Kusens et al. |
| 2018/0184984 A1 | 7/2018 | Zerhusen et al. |
| 2018/0189946 A1 | 7/2018 | Kusens et al. |
| 2018/0211464 A1 | 7/2018 | Kusens et al. |
| 2018/0218489 A1 | 8/2018 | Kusens |
| 2018/0250177 A1 | 9/2018 | Magill et al. |
| 2018/0271286 A1 | 9/2018 | Jacobs et al. |
| 2018/0271287 A1 | 9/2018 | Jacobs et al. |
| 2018/0303687 A1 | 10/2018 | Moreno et al. |
| 2018/0369035 A1 | 12/2018 | Bhimavarapu et al. |
| 2018/0369037 A1 | 12/2018 | Desaulniers et al. |
| 2018/0369038 A1 | 12/2018 | Bhimavarapu et al. |
| 2018/0369039 A1 | 12/2018 | Bhimavarapu et al. |
| 2018/0374573 A1 | 12/2018 | Bhimavarapu et al. |
| 2018/0374577 A1 | 12/2018 | Bhimavarapu |
| 2019/0008708 A1 | 1/2019 | Moreno et al. |
| 2019/0024882 A1 | 1/2019 | Jonsson et al. |
| 2019/0046373 A1 | 2/2019 | Coulter et al. |
| 2019/0262200 A1 | 8/2019 | Murai |
| 2019/0336367 A1 | 11/2019 | Zerhusen et al. |
| 2020/0121528 A1 | 4/2020 | Kaikenger et al. |
| 2020/0188204 A1 | 6/2020 | Newkirk et al. |
| 2021/0251579 A1 | 8/2021 | Nahavandi et al. |
| 2021/0346220 A1 * | 11/2021 | Bhimavarapu ........ A61G 7/018 |
| 2022/0071823 A1 | 3/2022 | Desaulniers et al. |

(56) References Cited

U.S. PATENT DOCUMENTS

FOREIGN PATENT DOCUMENTS

| | | |
|---|---|---|
| EP | 0727298 A1 | 8/1996 |
| EP | 0727298 B1 | 8/1999 |
| EP | 2489341 A2 | 8/2012 |
| EP | 2531159 A2 | 12/2012 |
| EP | 2619724 A2 | 7/2013 |
| EP | 2918255 A1 | 9/2015 |
| JP | 2003140631 A | 5/2003 |
| KR | 20130076922 A | 7/2013 |
| WO | 0101913 A1 | 1/2001 |
| WO | 2006089399 A2 | 8/2006 |
| WO | 2011097569 A2 | 8/2011 |
| WO | 2012040554 A2 | 3/2012 |
| WO | 2014021873 A1 | 2/2014 |
| WO | 2015148578 A2 | 10/2015 |
| WO | 2015157402 A1 | 10/2015 |
| WO | 2015171365 A1 | 11/2015 |
| WO | 2016123595 A1 | 8/2016 |
| WO | 2016196403 A1 | 12/2016 |
| WO | 2016200556 A1 | 12/2016 |
| WO | 2017027427 A1 | 2/2017 |
| WO | 2017031111 A1 | 2/2017 |
| WO | 2017061471 A1 | 4/2017 |
| WO | 2017124056 A1 | 7/2017 |
| WO | 2017201513 A1 | 11/2017 |
| WO | 2018026979 A1 | 2/2018 |
| WO | 2018154819 A1 | 8/2018 |
| WO | 2018203476 A1 | 11/2018 |
| WO | 2018216387 A1 | 11/2018 |

OTHER PUBLICATIONS

Astral Healthcare, "Opthalmology Day Surgery Chair Webpage", Apr. 2018, http://astralhealthcare.com/?product=opthalmology-day-surgery-chair, 6 pages.

Campbell, Mikey, "Apple Expected to Replace Touch ID With Two-Step Facial, Fingerprint Bio-Recognition Tech", Apple Insider, Jan. 21, 2017, http://iphone.appleinsider.com/articles/17/01/21/apple-expected-to-replace-touch-id-with-two-step-facial-fingerprint-bio-recognition-tech, 4 pages.

Doge Medical, "DOC Classic—DOC Surgery Chairs Webpage", 2014, 2 pages, https://web.archive.org/web/20140214203605/http://www.dogemedical.com/pages/en/products/surgery-chairs/doc-classic.php?lang=EN.

English language abstract and machine-assisted English translation for CN 101789230 extracted from espacenet.com database on Aug. 30, 2018, 31 pages.

English language abstract and machine-assisted English translation for JP 2003-140631 extracted from espacenet.com database on Aug. 30, 2018, 19 pages.

English language abstract and machine-assisted English translation for KR 2013-0076922 A extracted from espacenet.com database on Aug. 16, 2018, 8 pages.

English language abstract and machine-assisted English translation for WO 2017/061471 extracted from espacenet.com database on Mar. 25, 2019, 26 pages.

English language abstract and machine-assisted English translation for WO 2018/154819 extracted from espacenet.com database on Mar. 25, 2019, 35 pages.

English language abstract and machine-assisted English translation for WO 2018/203476 extracted from espacenet.com database on Mar. 25, 2019, 37 pages.

English language abstract and machine-assisted English translation for WO 2018/216387 extracted from espacenet.com database on Mar. 25, 2019, 43 pages.

English language abstract for DE 195 05 162 C1 extracted from espacenet.com database on Aug. 16, 2018, 1 page.

English language abstract for EP 0 727 298 A1 extracted from espacenet.com database on Aug. 16, 2018, 1 page.

English language abstract for EP 0 727 298 B1 extracted from espacenet.com database on Aug. 16, 2018, 1 page.

Hall, Stephen, "Nest's 3rd Generation Thermostat Gets Some New Views for Its Farsight Feature", 9 to 5 Google, Jun. 14, 2016, https://9to5google.com/2016/06/14/nest-3rd-gen-thermostat-views-farsight/, 4 pages.

Hill-Rom, "Centrella Smart+Bed Brochure" 2017, 11 pages.

Imore, "How to Use Night Shift on your iPhone or iPad", video also found at https://www.imore.com/night-shift, Nov. 1, 2017, 12 pages.

recliners.la "Stellar 550 Large Lift Chair Recliner Webpage", Apr. 2018, https://www.recliners.la/products/ultra-comfort-stellar-550-large-lift-chair, 4 pages.

Stryker Medical, "EPIC II Critical Care Bed, Model 2030 Operations Manual", 2030-309-001 Rev A, Nov. 2007, 53 pages.

Stryker Medical, "InTouch Critical Care Bed Operations Manual", Aug. 2014, 125 pages.

Stryker, "InTouch Critical Care Bed Model FL27 (2130/2140) Operations Manual—Optional Pendant Control", 2130-009-001 Rev C, Apr. 2008, p. 25.

Supportec-Trade, "Portfolilio Webpage", 2017, https://supportec-trade.nl/en, 2 pages.

Umano Medical Inc., "The Ook Snow Bed Webpages and Video", https://www.umanomedical.com/en-us/beds/ook-snow?showall=1, 2019, 6 pages.

U.S. Appl. No. 16/019,973, filed Jun. 27, 2018, 90 pages.
U.S. Appl. No. 16/019,986, filed Jun. 27, 2018, 57 pages.
U.S. Appl. No. 16/020,003, filed Jun. 27, 2018, 37 pages.
U.S. Appl. No. 16/020,052, filed Jun. 27, 2018, 48 pages.
U.S. Appl. No. 16/020,068, filed Jun. 27, 2018, 125 pages.
U.S. Appl. No. 16/020,085, filed Jun. 27, 2018, 67 pages.
U.S. Appl. No. 62/525,359, filed Jun. 27, 2017.
U.S. Appl. No. 62/525,363, filed Jun. 27, 2017.
U.S. Appl. No. 62/525,368, filed Jun. 27, 2017.
U.S. Appl. No. 62/525,373, filed Jun. 27, 2017.
U.S. Appl. No. 62/525,377, filed Jun. 27, 2017.
U.S. Appl. No. 62/783,442, filed Dec. 21, 2018.
U.S. Appl. No. 62/783,445, filed Dec. 21, 2018.

Youtube, "Memory Seat Escape Video", Nov. 4, 2013, https://www.youtube.com/watch?v=xlghNmAK-7A, 1 page.

Youtube, "Microsoft HoloLens: Partner Spotlight with Stryker Communications Video", Feb. 21, 2017, https://www.youtube.com/watch?v=FTPxUGRGpnA, 3 pages.

Youtube, "Scion xB 2010 Premium Head Unit with Video", https://www.youtube.com/watch?v=HHQ9pKUEWvw, Jun. 19, 2010, 2 pages.

Youtube, "Umano Medical Ook Snow New Hospital Bed (US Version) Video", Apr. 6, 2015, https://www.youtube.com/watch?v=MEnRNsVFqz0, 1 page.

U.S. Appl. No. 16/229,108, filed Dec. 21, 2018.

\* cited by examiner

PATIENT SUPPORT APPARATUS USER INTERFACES

CROSS-REFERENCE TO RELATED APPLICATIONS

This application is a Continuation of U.S. patent application Ser. No. 16/020,003, filed on Jun. 27, 2018, now U.S. Pat. No. 11,202,729, which claims priority to and all the benefits of U.S. Provisional Patent Application No. 62/525,373 filed on Jun. 27, 2017, the disclosures of each of which are hereby incorporated by reference in their entirety.

TECHNICAL FIELD

The present disclosure relates, generally, to patient support apparatuses and, more specifically, to patient support apparatus user interfaces.

BACKGROUND

Patient support apparatuses, such as hospital beds, stretchers, cots, tables, wheelchairs, and chairs are used to help caregivers facilitate care of patients in a health care setting. Conventional patient support apparatuses generally comprise a base and a patient support surface upon which the patient is supported. Often, these patient support apparatuses have one or more powered devices with motors to perform one or more functions, such as lifting and lowering the patient support surface, articulating one or more deck sections, raising a patient from a slouched position, turning a patient, centering a patient, extending a length or width of the patient support apparatus, and the like. Furthermore, these patient support apparatuses typically employ one or more sensors arranged to detect patient movement, monitor patient vital signs, and the like.

When a caregiver wishes to perform an operational function, such as operating a powered device that adjusts the patient support surface relative to the base, the caregiver actuates an input device of a user interface, often in the form of a touchscreen or a button on a control panel. Here, the user interface may also employ a screen to display visual content to the caregiver, such as patient data and operating or status conditions of the patient support apparatus. The visual content may further comprise various graphical menus, buttons, indicators, and the like, which may be navigated via the input device. Certain operational functions or features of the patient support apparatus may also be accessible to and adjustable by the patient. Here, the user interface may allow the patient to adjust the patient support surface between various positions or configurations, view and navigate visual content displayed on a screen (for example, a television program), adjust audio output (for example, volume), and the like.

As the number and complexity of functions integrated into conventional patient support apparatuses has increased, the associated user interfaces have also become more complex and expensive to manufacture. While conventional patient support apparatuses have generally performed well for their intended purpose, there remains a need in the art for a patient support apparatus which overcomes the disadvantages in the prior art and which affords caregivers and patients with improved usability and functionality in a number of different operating conditions.

DETAILED DESCRIPTION OF THE EMBODIMENTS

Referring to FIGS. 1A-4B, a patient support apparatus 30 is shown for supporting a patient P in a health care setting. The patient support apparatus 30 illustrated throughout the drawings is realized as a hospital bed. In other embodiments, however, the patient support apparatus 30 may be a stretcher, a cot, a table, a wheelchair, a chair, or a similar apparatus utilized in the care of patients.

A support structure 32 provides support for the patient P. In the representative embodiment illustrated herein, the support structure 32 comprises a base 34, an intermediate frame 36, and a patient support deck 38. The intermediate frame 36 and the patient support deck 38 are spaced above the base 34 in FIGS. 1A-1B. As is described in greater detail below, the intermediate frame 36 and the patient support deck 38 are arranged for movement relative to the base 34 between a plurality of vertical configurations 38A, 38B (compare FIGS. 1A-1B).

Figure 3A:
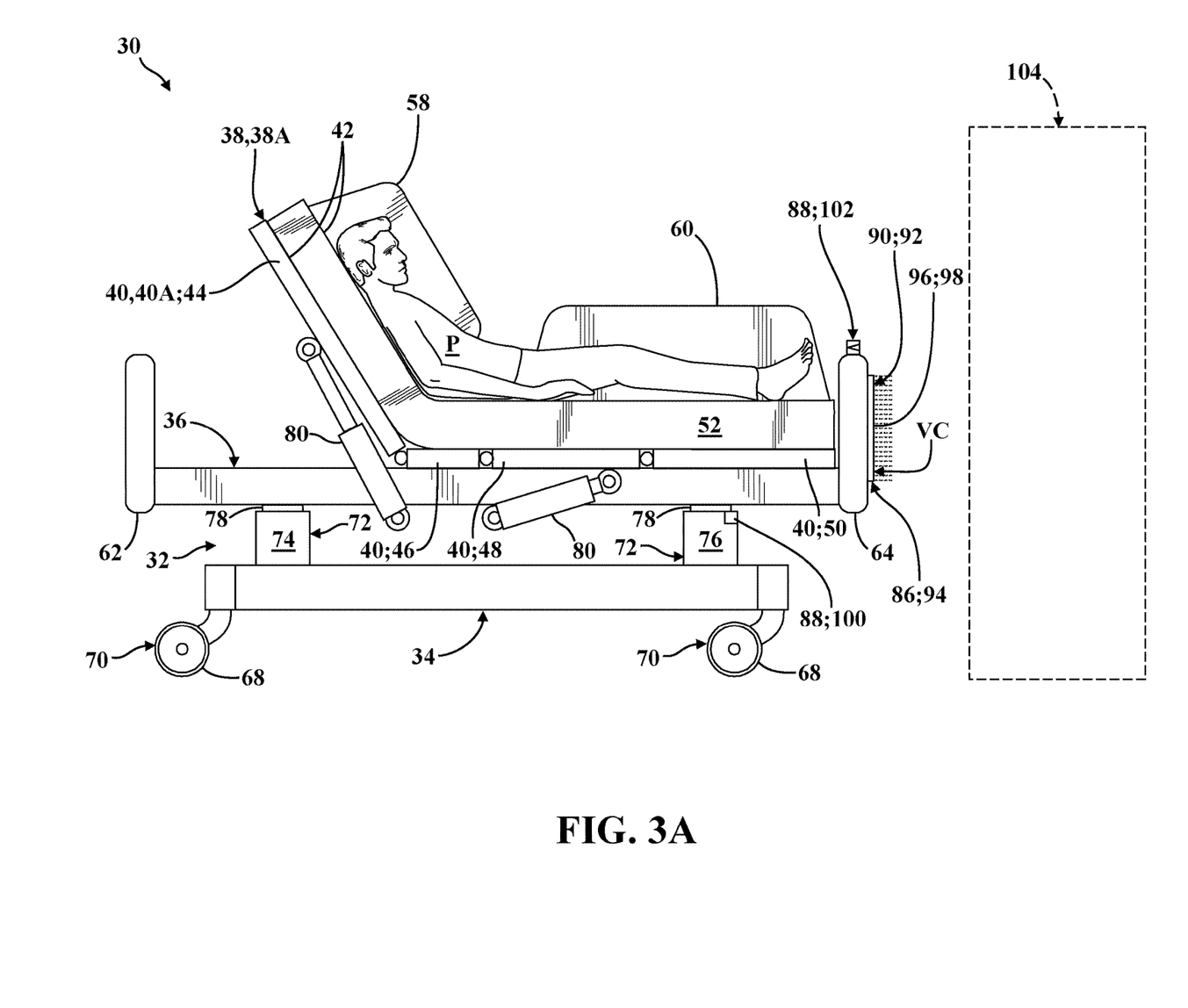
FIG. 3A is a right-side view of the patient support apparatus of FIGS. 1A-1B, shown with the patient support deck having a deck section arranged in a first section position, and with a proximity sensor shown operating to sense movement within an envelope adjacent to the caregiver-accessible user interface.
Figure 3B:
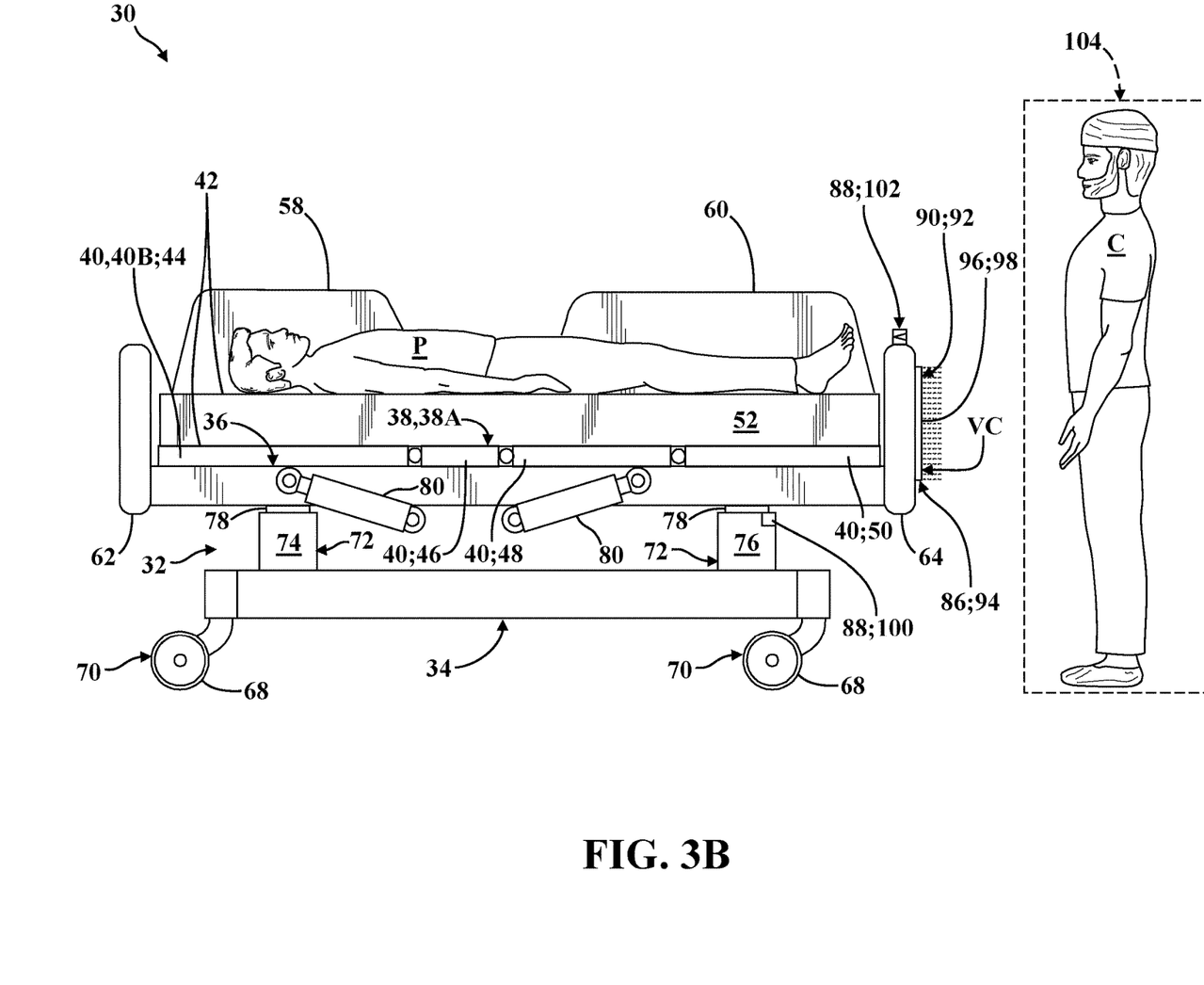
FIG. 3B is another right-side view of the patient support apparatus of FIG. 3A, shown with the deck section arranged in a second section position, and shown with a caregiver positioned within the envelope sensed by the proximity sensor.

As is best depicted in FIGS. 3A-3B, the patient support deck 38 has at least one deck section 40 arranged for movement relative to the intermediate frame 36 between a plurality of section positions 40A, 40B. The deck sections 40 of the patient support deck 38 provide a patient support surface 42 upon which the patient P is supported. More specifically, in the representative embodiments of the patient support apparatus 30 illustrated herein, the patient support deck 38 has four deck sections 40 which cooperate to define the patient support surface 42: a back section 44, a seat section 46, a leg section 48, and a foot section 50. Here, the seat section 46 is fixed to the intermediate frame 36 and is not arranged for movement relative thereto. However, it will be appreciated that the seat section 46 could be movable relative to other deck sections 40 in some embodiments. However, it will be appreciated that the seat section 46 could be movable relative to other deck sections 40 in some embodiments. Conversely, the back section 44 and the leg section 48 are arranged for independent movement relative to each other and to the intermediate frame 36, as described in greater detail below, and the foot section 50 is arranged to move partially concurrently with the leg section 48. Other configurations and arrangements are contemplated.

A mattress 52 is disposed on the patient support deck 38 during use. The mattress 52 comprises a secondary patient support surface 42 upon which the patient P is supported. The base 34, the intermediate frame 36, and the patient support deck 38 each have a head end and a foot end corresponding to designated placement of the patient's P head and feet on the patient support apparatus 30. It will be appreciated that the specific configuration of the support structure 32 may take on any known or conventional design, and is not limited to that specifically illustrated and described herein. In addition, the mattress 52 may be omitted in certain embodiments, such that the patient P can rest directly on the patient support surface 42 defined by the deck sections 40 of the patient support deck 38.

Side rails 54, 56, 58, 60 are coupled to the support structure 32 and are supported by the base 34. A first side rail 54 is positioned at a right head end of the intermediate frame 36. A second side rail 56 is positioned at a right foot end of the intermediate frame 36. A third side rail 58 is positioned at a left head end of the intermediate frame 36. A fourth side rail 60 is positioned at a left foot end of the intermediate frame 36. The side rails 54, 56, 58, 60 are advantageously movable between a raised position in which they block ingress and egress into and out of the patient support apparatus 30, one or more intermediate positions, and a lowered position in which they are not an obstacle to such ingress and egress. It will be appreciated that there may be fewer side rails for certain embodiments, such as where the patient support apparatus 30 is realized as a stretcher or a cot. Moreover, it will be appreciated that in certain configurations the patient support apparatus 30 may not include any side rails. Similarly, it will be appreciated that side rails may be attached to any suitable component or structure of the patient support apparatus 30. Furthermore, in certain embodiments the first and third side rails 54, 58 are coupled to a deck section 40 for concurrent movement between section positions 40A, 40B (for example, see FIGS. 3A-3B). In FIGS. 3A-3B, which depict right-side views of the patient support apparatus 30, the first and second side rails 54, 56 are omitted for clarity.

Figure 1A:
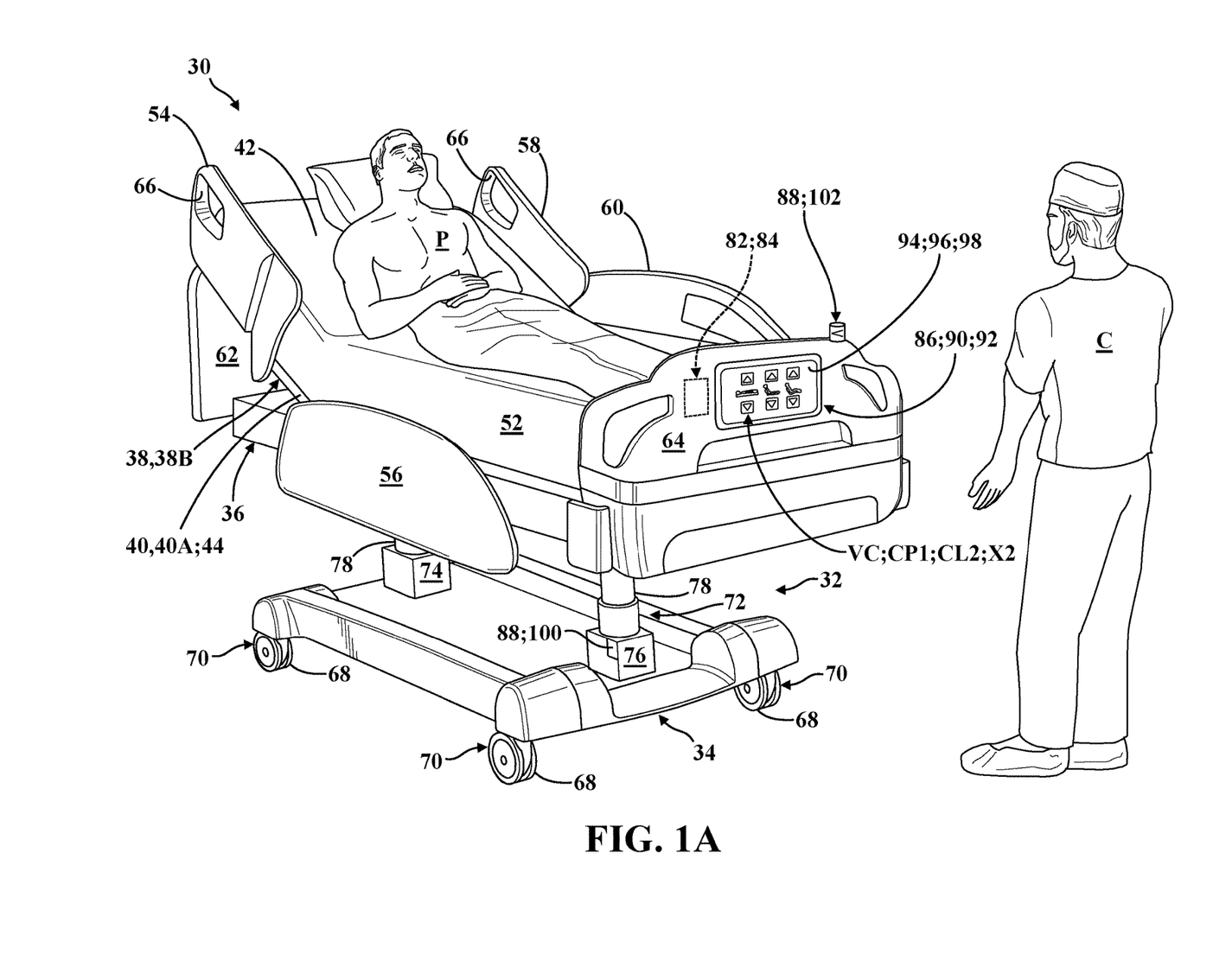
FIG. 1A is a perspective view of a patient support apparatus according to the present disclosure shown having a base, a patient support deck supporting a patient, a lift mechanism interposed between the base and the patient support deck supporting the patient support deck in a second vertical configuration relative to the base, and a user interface coupled to the patient support deck and arranged for use by a caregiver, the user interface shown having a screen displaying visual content in a second content layout.
Figure 1B:
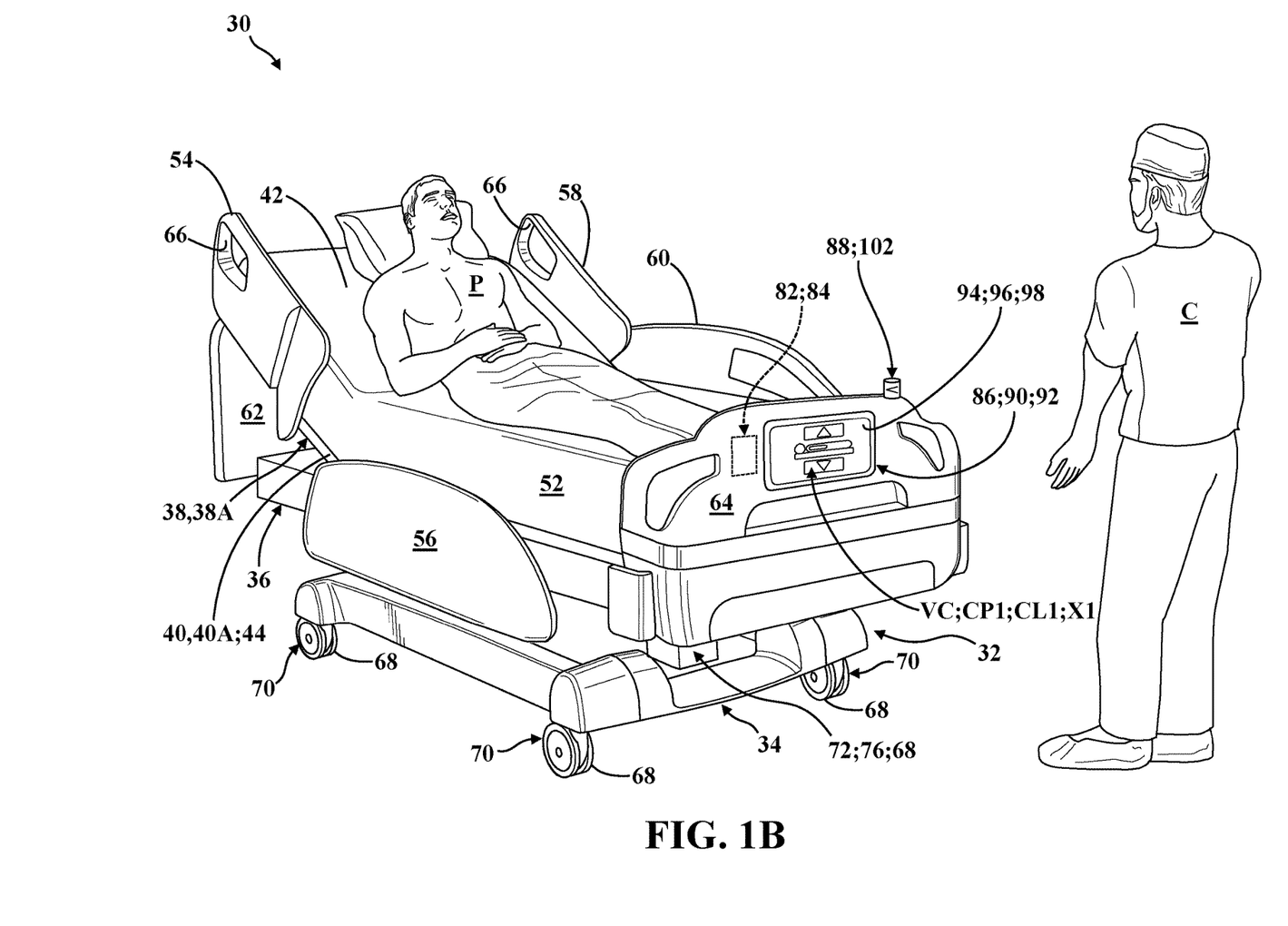
FIG. 1B is another perspective view of the patient support apparatus of FIG. 1A, shown with the lift mechanism supporting the patient support deck in a first vertical configuration relative to the base, and shown with the screen of the caregiver-accessible user interface displaying visual content in a first content layout.

As shown in FIGS. 1A-1B, a headboard 62 and a footboard 64 are coupled to the intermediate frame 36 of the support structure 32. However, it will be appreciated that the headboard 62 and/or footboard 64 may be coupled to other locations on the patient support apparatus 30, such as the base 34, or may be omitted in certain embodiments.

One or more caregiver interfaces 66, such as handles, are shown in FIGS. 1A-1B as being integrated into the first and third side rails 54, 58 to facilitate movement of the patient support apparatus 30. Additional caregiver interfaces 66 may be integrated into the headboard 62, the footboard 64, and/or other components of the patient support apparatus 30, such as the second and/or fourth side rails 56, 60, the intermediate frame 36, and the like. The caregiver interfaces 66 are shaped so as to be grasped by a caregiver as a way to position or otherwise manipulate the patient support apparatus 30 for movement. It will be appreciated that the caregiver interfaces 66 could be integrated with or operatively attached to any suitable portion of the patient support apparatus 30, or may be omitted in certain embodiments.

Wheels 68 are coupled to the base 34 to facilitate transportation over floor surfaces. The wheels 68 are arranged in each of four quadrants of the base 34, adjacent to corners of the base 34. In the embodiments shown, the wheels 68 are caster wheels able to rotate and swivel relative to the support structure 32 during transport. Here, each of the wheels 68 forms part of a caster assembly 70 mounted to the base 34. It should be understood that various configurations of the caster assemblies 70 are contemplated. In addition, in some embodiments, the wheels 68 may not be caster wheels. Moreover, it will be appreciated that the wheels 68 may be non-steerable, steerable, non-powered, powered, or combinations thereof. While the representative embodiment of the patient support apparatus 30 illustrated herein employs four wheels 68, additional wheels are also contemplated. For example, the patient support apparatus 30 may comprise four non-powered, non-steerable wheels, along with one or more additional powered wheels. In some cases, the patient support apparatus 30 may not include any wheels. In other embodiments, one or more auxiliary wheels (powered or non-powered), which are movable between stowed positions and deployed positions, may be coupled to the support structure 32. In some cases, when auxiliary wheels are located between caster assemblies 70 and contact the floor surface in the deployed position, they may cause two of the caster assemblies 70 to be lifted off the floor surface, thereby shortening a wheel base of the patient support apparatus 30. A fifth wheel may also be arranged substantially in a center of the base 34. Other configurations are contemplated.

Figure 4A:
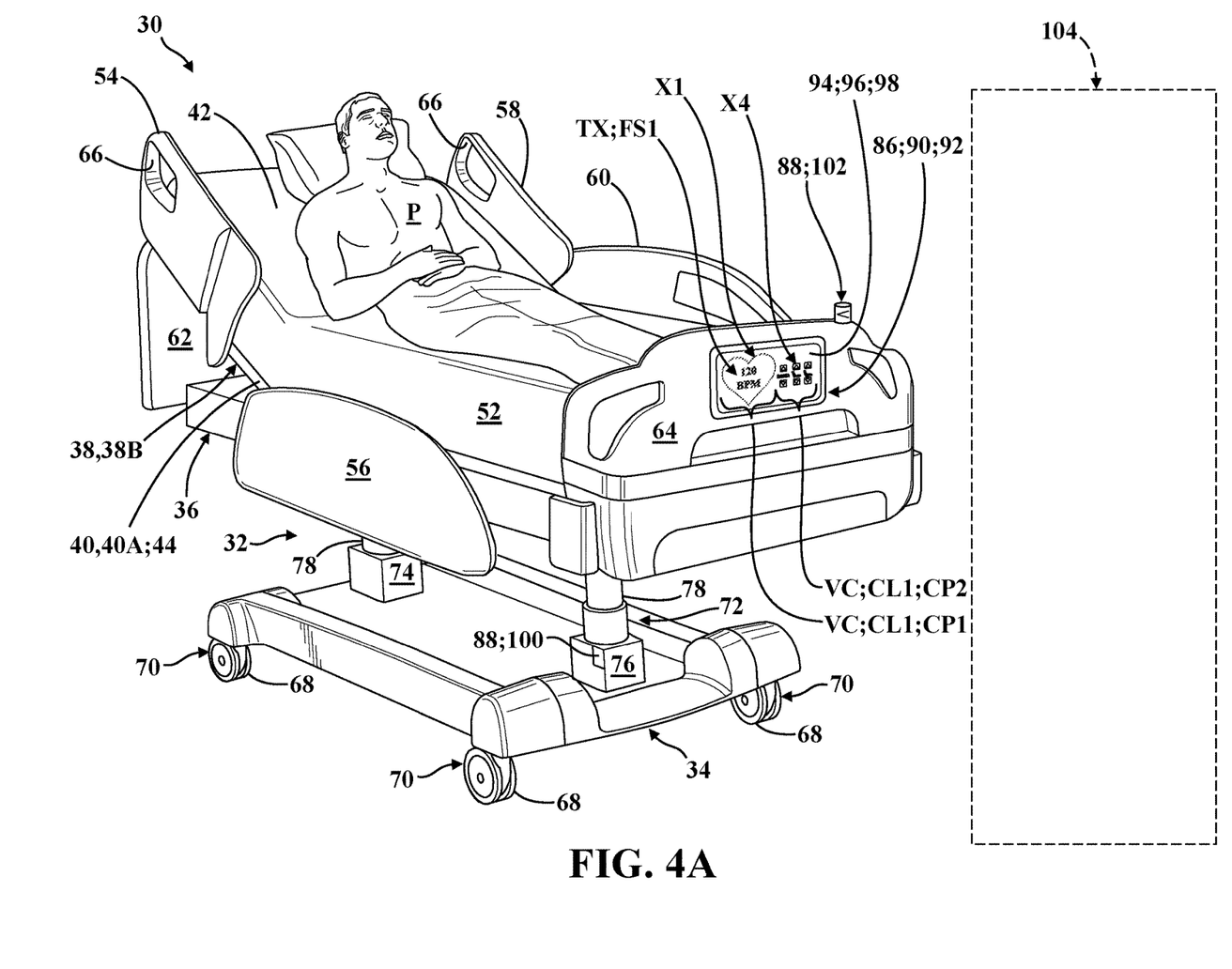
FIG. 4A is a perspective view of another embodiment of a patient support apparatus according to the present disclosure, shown with a user interface coupled arranged for use by a caregiver and having a screen displaying visual content in a first content layout, and with a proximity sensor shown operating to sense movement within an envelope adjacent to the caregiver-accessible user interface.
Figure 4B:
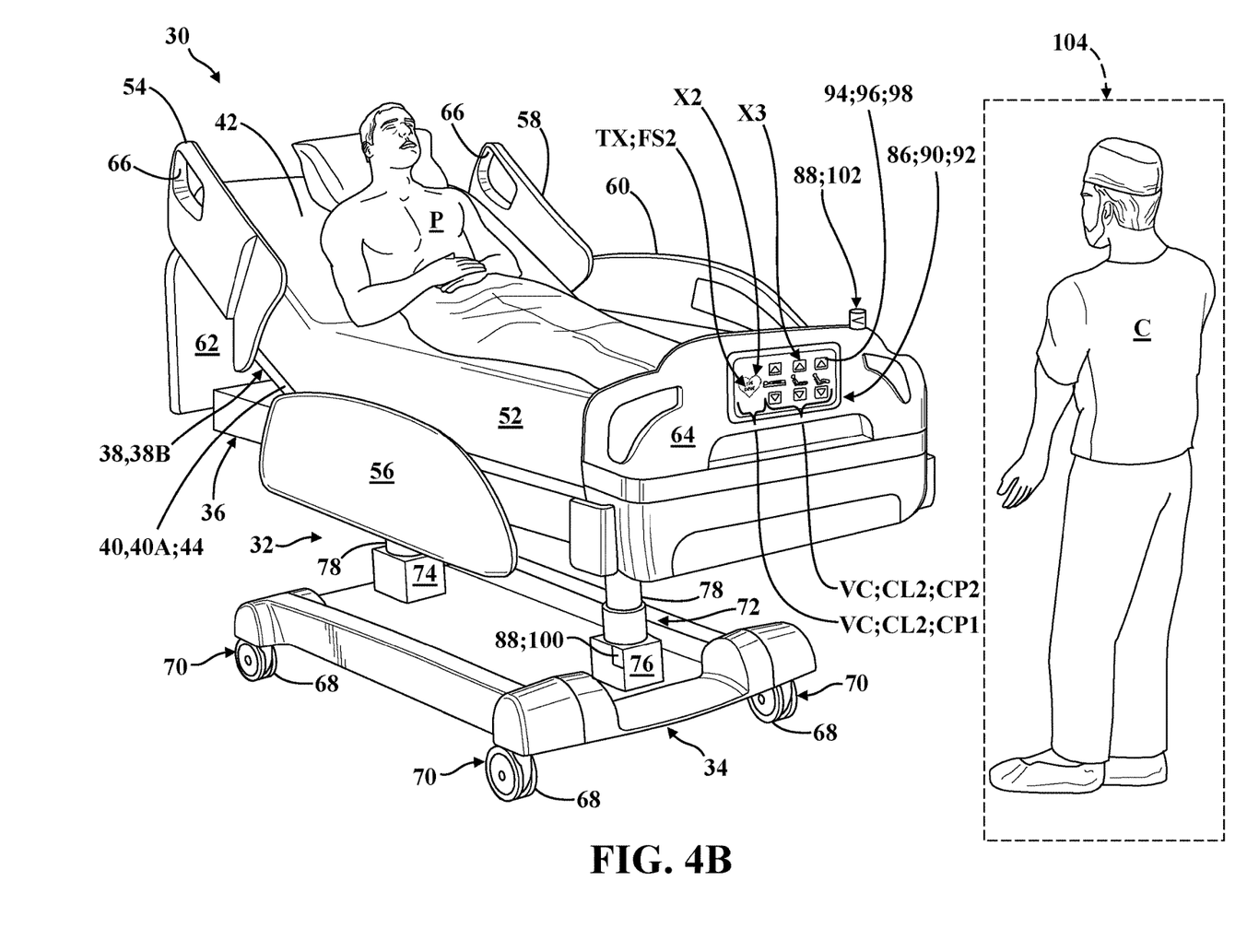
FIG. 4B is another perspective view of the patient support apparatus of FIG. 4A, shown with the screen of the caregiver-accessible user interface displaying visual content in a second content layout, and shown with a caregiver positioned within the envelope sensed by the proximity sensor.

The patient support apparatus 30 further comprises a lift mechanism, generally indicated at 72, which operates to lift and lower the intermediate frame 36 relative to the base 34 which, in turn, moves the patient support deck 38 between a first vertical configuration 38A (for example, a "lowered" vertical position as depicted in FIGS. 1B and 3A-3B), a second vertical configuration 38B (for example, a "raised" vertical position as depicted in FIGS. 1A and 4A-4B), or to any desired vertical position in between. To this end, the illustrated lift mechanism 72 comprises a head end lift member 74 and a foot end lift member 76 which are each arranged to facilitate movement of the intermediate frame 36 with respect to the base 34 using one or more lift actuators 78 (see FIGS. 1A and 2-4B; not shown in detail). The lift actuators 78 may be realized as linear actuators, rotary actuators, or other types of actuators, and may be electrically operated and/or may be hydraulic. It is contemplated that, in some embodiments, only one lift member and one associated lift actuator may be employed, e.g., to raise only one end of the intermediate frame 36, or one central lift actuator to raise and lower the intermediate frame 36. The construction of the lift mechanism 72, the head end lift member 74, and/or the foot end lift member 76 may take on any known or conventional design, and is not limited to that specifically illustrated. By way of non-limiting example, the lift mechanism 72 could comprise a "scissor" linkage arranged between the base 34 and the intermediate frame 36 with one or more actuators configured to facilitate vertical movement of the patient support deck 38.

As noted above, the patient support deck 38 is operatively attached to the intermediate frame 36, and the deck section 40 is arranged for movement between a first section position 40A (see FIG. 3A) and a second section position 40B (see FIG. 3B). To this end, one or more deck actuators 80 are interposed between the deck section 40 and the intermediate frame 36 to move the deck section 40 between the first section position 40A (see FIG. 3A), the second section position 40B (see FIG. 3B), and any other suitable section position. In the representative embodiment illustrated herein, the deck actuator 80 is realized as a linear actuator disposed in force-translating relationship between the deck section 40 and the intermediate frame 36. More specifically, one deck actuator 80 is provided between the intermediate frame 36 and the back section 44, and another deck actuator 80 is provided between the intermediate frame 36 and the leg section 48, and each of the deck actuators 80 is arranged for independent movement to position the respective deck sections 40 to adjust the shape of the patient support surface 42 between a plurality of patient support configurations (for example, a flat configuration, a raised fowler configuration, a seated configuration, etc.).

Those having ordinary skill in the art will appreciate that the patient support apparatus 30 could employ any suitable number of deck actuators 80, of any suitable type or configuration sufficient to effect selective movement of the deck section 40 relative to the support structure 32. By way of non-limiting example, the deck actuator 80 could be a linear actuator or one or more rotary actuators driven electronically and/or hydraulically, and/or controlled or driven in any suitable way. Moreover, the deck actuator 80 could be mounted, secured, coupled, or otherwise operatively attached to the intermediate frame 36 and to the deck section 40, either directly or indirectly, in any suitable way. In addition, one or more of the deck actuators 80 could be omitted for certain applications.

Figure 2:
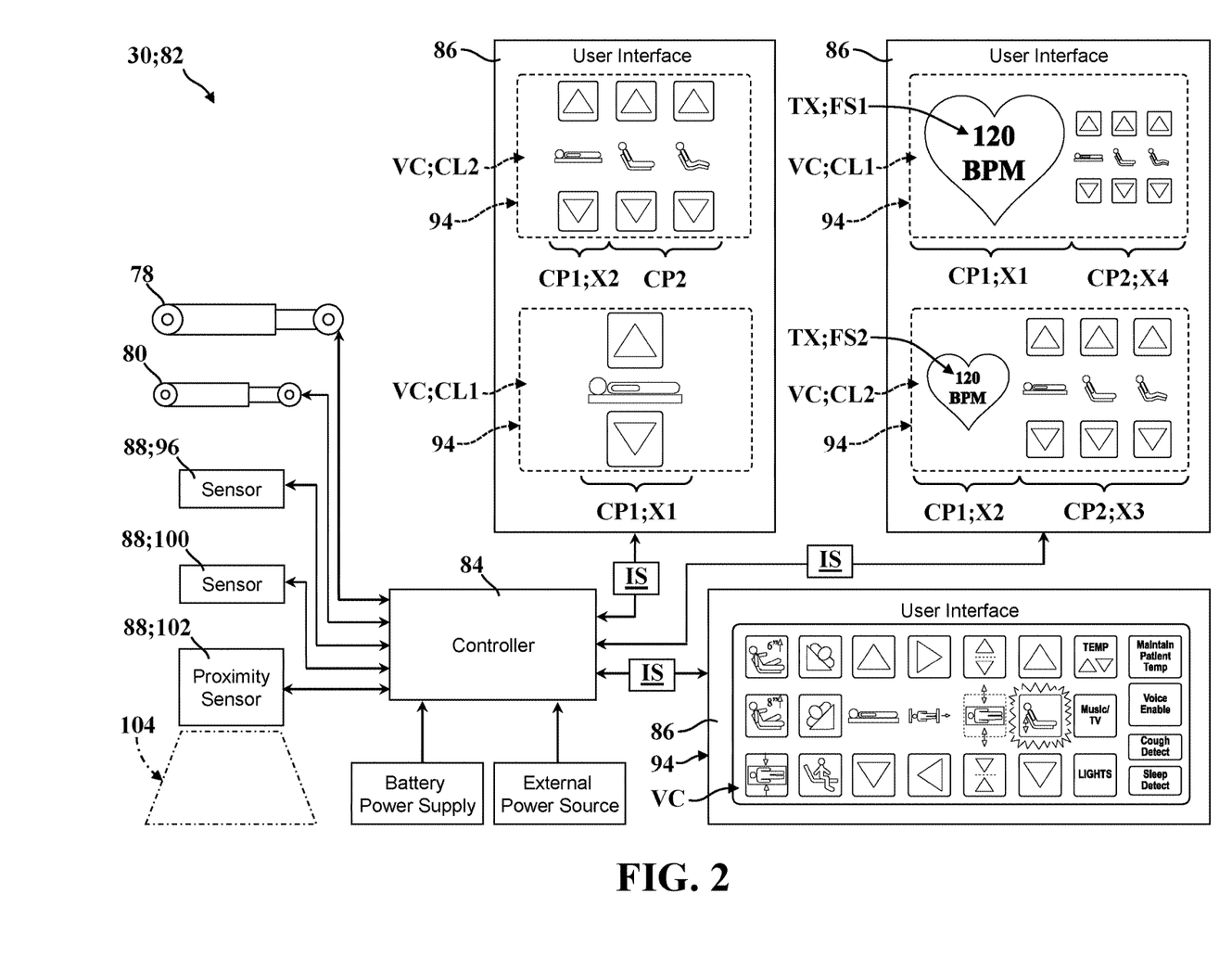
FIG. 2 is a partial schematic view of a control system of the patient support apparatus of FIGS. 1A-1B, the control system shown comprising a controller disposed in communication with embodiments of user interfaces displaying different visual content, and disposed in communication with actuators and sensors, including a proximity sensor schematically depicted as operating to sense movement within an envelope adjacent to the proximity sensor.

Referring now to FIGS. 1A-2, the patient support apparatus 30 employs a control system, generally indicated at 82, to effect operation of various functions of the patient support apparatus 30, as described in greater detail below. To this end, and as is best shown schematically in FIG. 2, the control system 82 generally comprises a controller 84 disposed in communication with one or more user interfaces 86 adapted for use by the patient P and/or a caregiver C to facilitate operation of one or more functions of the patient support apparatus 30. In certain embodiments, the controller 84 is also disposed in communication with the lift actuators 78, the deck actuators 80, and/or one or more sensors 88. Each of these components will be described in greater detail below.

As noted above, the controller 84 is best depicted schematically FIG. 2, and has been omitted from certain drawings for the purposes of clarity and consistency. It will be appreciated that the controller 84 and/or the control system 82 can be configured or otherwise arranged in a number of different ways. The controller 84 may have one or more microprocessors for processing instructions or for processing an algorithm stored in memory to control operation of the actuators 78, 80, generation or interpretation of an input signal IS, communication with the user interfaces 86, and the like. Additionally or alternatively, the controller 84 may comprise one or more microcontrollers, field programmable gate arrays, systems on a chip, discrete circuitry, and/or other suitable hardware, software, or firmware that is capable of carrying out the various functions and operations described herein. The controller 84 may be carried on-board the patient support apparatus 30, such as on the base 34, or may be remotely located. The controller 84 may comprise one or more subcontrollers configured to control all of the actuators 78, 80 and/or user interfaces 86 or one or more subcontrollers for each actuator 78, 80 and/or user interface 86. The controller 84 may communicate with the actuators 78, 80 and/or the user interfaces 86 via wired or wireless connections.

In the representative embodiment illustrated in FIGS. 1A-1B, the patient support apparatus 30 comprises one or more user interfaces 86 which may be accessible by the patient P, the caregiver C, or by both the caregiver C and the patient P. The user interface 86 of the patient support apparatus 30 generally comprises an input device 90 configured to generate an input signal IS in response to activation by a user which, in turn, is communicated to the controller 84. The controller 84, in turn, is responsive to the input signal IS and can control or otherwise carry out one or more functions of the patient support apparatus 30 in response to receiving the input signal IS. Put differently, the controller 84 is configured to perform a function of the patient support apparatus 30 in response to receiving the input signal IS from the input device 90. By way of non-limiting example, the input device 90 could be realized as a "lift bed" button, activation of which causes the controller 84 to drive the lift actuators 78 to move the patient support deck 38 and the intermediate frame 36 from the first vertical configuration 38A (see FIG. 1B) vertically away from the base 34 towards the second vertical configuration 38B (see FIG. 1A). Moreover, in some embodiments, the controller 84 may be configured to facilitate navigation of visual content VC of the user interface 86 in response to receiving the input signal IS from the input device 90. Thus, it will be appreciated that the user interface 86 could be configured in a number of different ways sufficient to generate the input signal IS. As such, it will be appreciated that the user interfaces 86 could be of a number of different styles, shapes, configurations, and the like.

In the representative embodiments illustrated herein, the user interface 86 is realized as a touchscreen 92 comprising a screen 94 and a touch sensor 96. As is described in greater detail below, the screen 94 is configured to display visual content VC to the user, and may be of any suitable size, shape, and/or orientation sufficient to display visual content VC. By way of non-limiting example, the screen 94 could be realized as a curved LCD panel extending along the length or width of the patient support apparatus 30. The touch sensor 96 is operatively attached to the screen 94, and defines an input surface 98 arranged adjacent to the screen 94 that is adapted for interaction with the user (e.g., the caregiver C and/or the patient P). Thus, the screen 94 generally forms part of one or more of the user interfaces 86 for operating the patient support apparatus 30, such as where activation or manipulation of the input device 90 (for example, a touch sensor 96 operatively attached to the screen 94) generates the input signal IS used by the controller 84 to facilitate navigation and/or activation of the visual content VC (e.g., by navigating menus and/or actuating virtual buttons represented as visual content VC on the screen 94 by engaging the touch sensor 96).

In the illustrated embodiment, the screen 94 is operatively attached to the patient support apparatus 30 for concurrent movement. More specifically, the screen 94 is coupled to the footboard 64 for concurrent movement with the patient support deck 38 between the vertical configurations 38A, 38B via the lift mechanism 72, as noted above (compare FIGS. 1A-1B). However, it will be appreciated that the screen 94 could be located remotely from the input device 90. In some embodiments, the user interface 86 is configured to generate a haptic signal, such as vibration from a motor adjacent to the screen 94, in response to activation of the input device 90. Other arrangements and configurations are contemplated.

In some embodiments, the patient support apparatus 30 further comprises a lift sensor, generally indicated at 100, to determine movement of the patient support deck 38 between the vertical configurations 38A, 38B via the lift mechanism 72 (compare FIGS. 1A-1B). Here, the lift sensor 100 is disposed in communication with the controller 84 which, in turn, is configured to display visual content VC on the screen 94 in different ways based on the position of the patient support deck 38 relative to the base 34 determined (or "sensed") via the lift sensor 100, as is described in greater detail below in connection with FIGS. 1A-2.

Those having ordinary skill in the art will appreciate that the lift sensor 100 could be realized in a number of different ways. By way of non-limiting example, the lift sensor 100 could be realized as one or more discrete components, such as a linear potentiometer, a range sensor, a hall-effect sensor, a limit switch, an accelerometer, a gyroscope, and the like generally configured or arranged to measure position, height, and/or movement. Further, the lift sensor 100 could be an encoder, a current sensor, and the like coupled to or in communication with one of the lift actuators 78. Moreover, the functionality afforded by the lift sensor 100 could be entirely or partially realized with software or code for certain applications. Other configurations are contemplated.

In some embodiments, the patient support apparatus 30 further comprises a proximity sensor, generally indicated at 102, to determine movement occurring within an envelope 104 defined adjacent to a caregiver-accessible user interface 86 coupled to the footboard 64 of the patient support apparatus 30 (see FIGS. 2-4B). Here, the proximity sensor 102 is disposed in communication with the controller 84 which, in turn, is configured to display visual content VC on the screen 94 in different ways based on the presence or absence of movement occurring within the envelope 104 determined (or "sensed") by the proximity sensor 102, as is described in greater detail below in connection with FIGS. 2-4B.

Those having ordinary skill in the art will appreciate that the proximity sensor 102 could be realized in a number of different ways. By way of non-limiting example, the proximity sensor 102 could be realized as one or more discrete components, such as a photoelectric emitter/sensor, a photodetector sensor, a laser rangefinder, a passive charge-coupled device (e.g., a digital camera), a passive thermal infrared sensor (e.g., a forward-looking infrared camera), a radar transmitter/sensor, a sonar transmitter/sensor, and the like generally configured or arranged to detect changes in heat, air pressure, and/or position and/or movement. The proximity sensor 102 could also be realized as a detector configured to respond to the presence or absence of a token, tracker, badge, portable electronic device, and the like carried by the caregiver (e.g., via radio-frequency identification, near-field communication, global positioning satellites, Bluetooth®, Wi-Fi™, and the like). Further, the proximity sensor 102 could be realized as a part of the touchscreen 92 in some embodiments, such as based on electrostatic fields generated with a capacitive-type touch sensor 96. Here too, the functionality afforded by the proximity sensor 102 could be entirely or partially realized with software or code for certain applications. Other configurations are contemplated.

As noted above, in the representative embodiment illustrated in FIGS. 1A-2, the screen 94 forms part of a caregiver-accessible user interface 86 which presents visual content VC to the caregiver C in different ways based on or otherwise corresponding to the arrangement of the patient support deck 38 relative to the base 34. To this end, the controller 84 employs the lift sensor 100 to determine the relative position of the patient support deck 38 between the first and second vertical configurations 38A, 38B, displays visual content VC on the screen 94 in a first content layout CL1 when the patient support deck 38 is in the first vertical configuration 38A (see FIG. 1B), and displays visual content VC on the screen 94 in a second content layout CL2 when the patient support deck 38 is in the second vertical configuration 38B (see FIG. 1A). The visual content VC and first and second content layouts CL1, CL2 will be described in greater detail below.

It will be appreciated that multiple lift sensors 100 could be employed by the controller 84 in certain embodiments, such as to facilitate differentiating the respective heights of the head-end and the foot-end of the patient support deck 38. This differentiation may be used to adjust, optimize, or otherwise change how visual content VC is presented on the screen 94 in some embodiments. Here, it will be appreciated that the specific position and/or orientation of the screen 94 may change relative to the caregiver C based on how the patient support deck 38 is orientated because the screen 94 is coupled to the footboard 64 in the illustrated embodiment. Thus, in embodiments of the patient support apparatus 30 where the head end lift member 74 and the foot end lift member 76 can be driven or otherwise actuated independently (e.g., to place the patient support deck 38 in a Trendelenburg position), the controller 84 could be configured to display visual content VC in different ways based on the orientation and/or position of the screen 94 relative to the base 34 (e.g., using one or more accelerometers, gyroscopes, inertial sensors, and the like). To this end, and by way of non-limiting example, the controller 84 could accommodate changes in the orientation of the screen 94 by presenting, rendering, or otherwise displaying different types of visual content VC, by scaling visual content VC, and/or by otherwise modifying visual content VC as the lift members 74, 76 move the patient support deck 38 to and between different configurations. Other embodiments are contemplated.

As will be appreciated from the subsequent description of the control system 82 in connection with FIG. 2 below, in some embodiments, the visual content VC represents a navigable graphical interface which serves as part of the user interface 86 employed to control the patient support apparatus 30. Here, because the screen 94 moves currently with the patient support deck 38 between the vertical configuration 38A, 38B as noted above, the screen 94 is necessarily further away from the caregiver's C eyes in the first vertical configuration 38A (see FIG. 1B) than in the second vertical configuration 38B (see FIG. 1A). Thus, the visual content VC displayed by the screen 94 in the first content layout CL1 may be scaled, arranged, or otherwise configured differently from the second content layout CL2 in some embodiments so as to improve visibility and functionality when the screen 94 is positioned further away from the caregiver C.

With continued reference to the embodiment illustrated in FIGS. 1A-1B, the visual content VC comprises a first content portion CP1, the first content layout CL1 comprises a first scaling factor X1 which is associated with the first content portion CP1, and the second content layout CL2 comprises a second scaling factor X2 which is likewise associated with the first content portion CP1. Here, the first scaling factor X1 is greater than the second scaling factor X2 such that at least the first content portion CP1 of the visual content VC displayed by the screen 94 is "larger" when the patient support deck 38 is in the first vertical configuration 38A (see FIG. 1B) compared to when the patient support deck 38 is in the second vertical configuration 38B (see FIG. 1A). In some embodiments, the visual content VC further comprises a second content portion CP2 (see FIGS. 2 and 4A-4B) which is distinguishable from the first content portion CP1.

Those having ordinary skill in the art will appreciate that the visual content VC can be delineated in a number of different ways, and may comprise any suitable number of content portions CP1, CP2 which may be distinguishable from each other (e.g., discrete icons, menus, graphics, symbols, buttons, and the like). Thus, in some embodiments, discrete portions of the same content portion may change in different ways. By way of non-limiting example, and as is described in greater detail below in connection with the embodiment depicted in FIGS. 4A-4B, the first content portion CP1 may comprises graphics which change between the first and second content layouts CL1, C12 based on the first and second scaling factors X1, X2, and the first content portion CP1 may also comprise text TX which changes between first and second font sizes FS1, FS2. Thus, it will be appreciated that sub-portions of one content portion may change relative to each other (e.g., the graphics and text TX of the first content portion CP1) and/or relative to a different content portion (e.g., CP2) as the screen 94 displays different content layouts CL1, CL2.

As will be appreciated from the subsequent description below, the first and/or the second content layouts CL1, CL2 can be configured in a number of different ways so as to optimize the functionality and visibility of the visual content VC based on changes between the vertical configurations 38A, 38B (and/or based on other parameters associated with utilization of the patient support apparatus 30 as described in greater detail below). By way of non-limiting example, the second content layout CL2 shown in FIG. 1A includes a total of six virtual "buttons" which may be used to control three exemplary features of the patient support apparatus 30, while the first content layout CL1 shown in FIG. 1B includes two larger virtual "buttons" for controlling one of these three exemplary features of the patient support apparatus 30. In this representative embodiment, these two "buttons" are associated with the first content portion CP1 and are provided for lifting and/or lowering the patient support deck 38. Here, it will be appreciated that by increasing the size of the first content portion CP1 when the patient support deck 38 is positioned closer to the base 34 the caregiver C is presented with larger virtual "buttons" which afford improved visibility and ease of engagement under certain operating conditions of the patient support apparatus (e.g., when the screen 94 of the user interface 86 is closer to the floor).

Furthermore, it will be appreciated that the visual content VC could dynamically change between the content layouts CL1, CL2 as the patient support deck 38 moves between the vertical configurations 38A, 38B. By way of non-limiting example, the controller 84 could linearly scale the first content portion CP1 of the visual content VC, such as by using the scaling factors X1, X2 as respective end-points between the vertical configurations 38A, 38B, to display visual content VC at an intermediate content layout CL1.5 with an intermediate scaling factor X1.5 when the patient support deck 38 is between the first and second vertical configurations 38A, 38B (not shown). In addition, it will be appreciated that the controller 84 can display visual content VC in different ways, based such as on which direction the patient support deck 38 is moving. By way of non-limiting example, when the patient support deck 38 is moved towards the floor as the caregiver C actuates a "lower bed" button, the content layout could dynamically change to increase the size of the "lower bed" button as the patient support deck 38 moves closer to the floor. In some embodiments, one or more content portions CP1, CP2 of the visual content VC may change concurrently or separately in ways other than by resizing graphics and text TX based on the scaling factors X1, X2. By way of non-limiting example, as the "lower bed" button associated with the first content portion CP1 is scaled up in size in response to movement toward the first vertical configuration 38A, other buttons, controls, or information (e.g., associated with the second content portion CP2 or another content portion) could be hidden, moved off-screen, and the like. In some embodiments, once the patient support deck 38 has been positioned as close to the floor as possible in the first vertical configuration 38A, the controller 84 could hide everything associated with the first content portion CP1 except for a large "bed up" button used to subsequently move the patient support deck 38 away from the floor. Here in this embodiment, after the "bed up" button has actuated by the caregiver C, the "bed up" button could remain unchanged in size until released, and then the controller 84 could subsequently display different visual content VC (e.g., the first content portion CP1 depicted in FIG. 1A) based on the current position of the patient support deck 38. Other embodiments and configurations are contemplated.

Referring now to FIGS. 2-4B, as noted above, the illustrated embodiment of the patient support apparatus 30 employs the controller 84 to adjust visual content VC displayed on the screen 94 based on movement within the envelope determined via the proximity sensor 102. To this end, the controller 84 is configured to display visual content VC in the first content layout CL1 during an absence of movement occurring within the envelope 104 sensed by the proximity sensor 102 (see FIGS. 2, 3A, and 4A), and to display visual content VC in the second content layout CL2 in response to movement occurring within the envelope 104 sensed by the proximity sensor 102. Here, one or more of the first content portion CP1, the second content portion CP2, other content portions, or sub-portions of content portions of the visual content VC may change in various ways depending on how the patient support apparatus 30 utilizes the proximity sensor 102.

In the representative embodiment depicted in FIGS. 4A-4B (see also FIG. 2), the proximity sensor 102 is coupled to the footboard 64 adjacent to and spaced from the screen 94 of the caregiver-accessible user interface 86. As is depicted in FIGS. 3A-4B, this arrangement positions the envelope 104 adjacent to the foot-end of the patient support apparatus 30 such that when movement is sensed by the proximity sensor nearby the foot-end of the patient support apparatus 30, the controller 84 adjusts, alters, or otherwise changes the visual content VC displayed on the screen 94 from the first content layout CL1 (see FIG. 4A) to the second content layout CL2 (see FIG. 4B). Put differently, the arrangement of the proximity sensor 102 described above allows the caregiver C to view visual content VC in different ways based on their distance from (or proximity to) the patient support apparatus.

Those having ordinary skill in the art will appreciate that this configuration affords the caregiver C with the ability to view visual content VC from a distance and without necessarily approaching the patient support apparatus 30. This can be advantageous in situations where the caregiver C wants to observe certain types of relevant visual content VC displayed on the screen 94 without disturbing the patient P, such as when the patient P is resting or asleep. In addition, it will be appreciated that this configuration also affords the caregiver C with the ability to automatically transition to visual content VC which is more relevant when viewed closer to the screen 94.

By way of non-limiting example, in the representative embodiment illustrated in FIGS. 4A-4B (see also FIG. 2), the visual content VC comprises first and second content portions CP1, CP2 which are similar to but different from the embodiment described above in connection with FIGS. 1A-1B. In this embodiment, the second content portion CP2 comprises the six virtual "buttons" described above, and the first content portion CP1 comprises a graphical representation of a heart in which text TX, representing the patient's P current heartrate, is displayed (determined such as with a patient monitoring system, one or more patient sensors, and the like).

As shown in FIGS. 2 and 4A-4B, both the text TX and the graphical representation of the heart, which together comprise the first content portion CP1 in this embodiment, are associated with and sized according to the first scaling factor X1 when the controller 84 displays the first content layout CL1 on the screen 94 (see FIG. 4A), and are associated with and sized according to the second scaling factor X2 when the controller 84 displays the second content layout CL2 on the screen 94 (see FIG. 4B). Here too, the first scaling factor X1 is greater than the second scaling factor X2 (compare FIGS. 4A-4B; see also FIG. 2). Furthermore, as noted above, sub-portions of the same content portion of the visual content VC can be displayed on the screen 94 in different ways relative to, or independent of, one another in certain embodiments. Here and to this end, the text TX of the first content portion CP1 (which represents the patient's current heartrate in this embodiment) comprises a first font size FS1 (see FIGS. 2 and 4A) associated with the first scaling factor X1, and a second font size FS2 (see FIGS. 2 and 4B) associated with the second scaling factor X2. In this embodiment, the font sizes FS1, FS2 correlate directly with (and proportional to) the scaling factors X1, X2 such that the first font size FS1 is larger than the second font size FS2. However, other configurations and relationships are contemplated (e.g., non-proportional relationships and/or inverse relationships such as those that would decrease the font size as the scaling factor increases). Thus, in this embodiment, each of the sub-portions of the first content portion CP1 are sized larger in the first content layout CL1 than they are sized in the second content layout CL2 (compare FIGS. 4A-4B; see also FIG. 2).

With continued reference to FIGS. 2 and 4A-4B, in this embodiment, the second content portion CP2 comprising the six virtual "buttons" described above is associated with and sized according to a third scaling factor X3 when the controller 84 displays the second content layout CL2 on the screen 94 (see FIG. 4B), and is associated with and sized according to a fourth scaling factor X4 when the controller 84 displays the first content layout CL1 on the screen 94 (see FIG. 4A). Here, the third scaling factor X3 is greater than the fourth scaling factor X4 (compare FIGS. 4A-4B; see also FIG. 2). Thus, in this embodiment, each of the sub-portions of the second content portion CP2 are sized smaller in the first content layout CL1 than they are sized in the second content layout CL2 (compare FIGS. 4A-4B; see also FIG. 2).

As noted above, when visual content VC is displayed in the first content layout CL1, the sub-portions of the first content portion CP1 are scaled larger than they are scaled when in the second content layout CL2, whereas the sub-portions of the second content portion CP2 are scaled smaller (see FIGS. 2 and 4A). Conversely, when visual content VC is displayed in the second content layout CL2, the sub-portions of the first content portion CP1 are scaled smaller than they are scaled when in the first content layout CL1, whereas the sub-portions of the second content portion CP2 are scaled larger (see FIGS. 2 and 4B).

Because the controller 84 is configured to display visual content VC on the screen 94 in the first content layout CL1 during an absence of movement occurring within the envelope 104 in this embodiment, the caregiver C is able to observe visual content VC on the screen 94 which reflects the patient's P heartrate in a larger size than virtual "buttons" of the user interface 86 while they are positioned away from the patient support apparatus 30. This allows the caregiver C to view the patient's P heartrate from a distance and without necessarily requiring that the caregiver C come into close proximity with the patient support apparatus 30 (e.g., with a quick glance into the patient's P room while making rounds so as not to disturb to the patient P). Moreover, while it is contemplated that the second content portion CP2 of the visual content VC could be displayed or otherwise adjusted in ways other than by scaling as noted above (e.g., by hiding one or more sub-portions of the second content portion CP2), it may be advantageous in certain applications for one or more virtual "buttons" to remain displayed on the screen 94 in a smaller size alongside the larger heartrate text TX. Here, the continued presence of the second content portion CP2 in the first content layout CL1, even with a smaller size when viewed from a distance, may communicate useful status information about the patient support apparatus 30. By way of example, status information communicated by the smaller sized second content portion CP2 could assure the caregiver that certain features of the patient support apparatus 30 remained "locked," that one or more of the deck sections 40 haven't been adjusted recently, that the patient P hasn't attempted to exit the patient support apparatus 30 without assistance, and the like. Other configurations are contemplated.

Furthermore, because the controller 84 is configured to display visual content VC on the screen 94 in the second content layout CL2 in response to movement occurring within the envelope 104 in this embodiment, the caregiver C is able to observe visual content VC on the screen 94 which reflects the patient's P heartrate in a smaller size than virtual "buttons" of the user interface 86 while they are positioned nearby the patient support apparatus 30. This allows the caregiver C to continue viewing the patient's P heartrate on the screen 94 in a smaller size as they approach the patient support apparatus 30, while simultaneously improving their ability to view the virtual "buttons" of the user interface 86 by scaling the second content portion CP2 to a larger size. Put differently, because the embodiments of the present disclosure allow visual content VC to be presented to the caregiver C in different ways based on their proximity to the patient P and/or to the patient support apparatus 30, visual content VC which is relevant when the caregiver C is standing next to the patient support apparatus 30 (e.g., virtual "buttons" of the user interface 86 that raise or lower the patient support deck 38) can automatically be presented on the screen 94 more prominently than when they the caregiver C is further away from the patient support apparatus 30, where different visual content VC be more relevant to the caregiver C (e.g., large text TX representing the patient's P current heartrate).

Like the embodiment described above in connection with FIGS. 1A-2, changes in the visual content VC may occur in a number of different ways, including where changing between the first and second content layouts CL1, CL2 occurs in "steps" (e.g., with or without an intermediate content layout CL1.5), or where changing between the first and second content layouts CL1, CL2 occurs progressively and/or dynamically. Furthermore, it will be appreciated that the examples described above represent illustrative examples of certain implementations of the embodiments of the present disclosure which have been described separately herein for the purposes of clarity and consistency. Other configurations are contemplated herein, including without limitation utilizing the controller 84 to adjust, change, or otherwise present visual content VC displayed in the screen 94 in different ways to differentiate between correspondingly different modes, states, conditions, and/or use of the patient support apparatus 30, with or without the use of additional (and/or different types of) sensors 88.

In this way, the embodiments of the present disclosure afford significant opportunities for enhancing the functionality and operation of user interfaces 86 employed by patient support apparatuses 30. Specifically, visual content VC can be displayed and viewed in a number of different ways which contribute to improved usability of the patient support apparatus 30 without necessitating the use of overtly expensive hardware. Moreover, visual content can be displayed and in ways that provide caregivers C with convenient, easy-to-use, and intuitive features. Thus, the patient support apparatus 30 can be manufactured in a cost-effective manner while, at the same time, affording opportunities for improved functionality, features, and usability.

As noted above, the subject patent application is related to U.S. Provisional Patent Application No. 62/525,373 filed on Jun. 27, 2017. In addition, the subject patent application is also related to: U.S. Provisional Patent Application No. 62/525,353 filed on Jun. 27, 2017 and its corresponding Non-Provisional patent application Ser. No. 16/020,068 filed on Jun. 27, 2018, now U.S. Pat. No. 11,337,872; U.S. Provisional Patent Application No. 62/525,359 filed on Jun. 27, 2017 and its corresponding Non-Provisional patent application Ser. No. 16/020,052 filed on Jun. 27, 2018, now U.S. Pat. No. 11,382,812; U.S. Provisional Patent Application No. 62/525,363 filed on Jun. 27, 2017 and its corresponding Non-Provisional patent application Ser. No. 16/020,085 filed on Jun. 27, 2018; U.S. Provisional Patent Application No. 62/525,368 filed on Jun. 27, 2017 and its corresponding Non-Provisional patent application Ser. No. 16/019,973 filed on Jun. 27, 2018, now U.S. Pat. No. 11,096,850; and U.S. Provisional Patent Application No. 62/525,377 filed on Jun. 27, 2017 and its corresponding Non-Provisional patent application Ser. No. 16/019,986 filed on Jun. 27, 2018, now U.S. Pat. No. 10,811,136. The disclosures of each of the above-identified Provisional Patent Applications and corresponding Non-Provisional patent applications are each hereby incorporated by reference in their entirety.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention is intended to be defined in the independent claims, with specific features laid out in the dependent claims, wherein the subject-matter of a claim dependent from one independent claim can also be implemented in connection with another independent claim.

What is claimed is:

1. A patient support apparatus comprising:
a base;
a patient support deck operatively attached to the base and arranged for movement relative to the base;
a lift mechanism interposed between the base and the patient support deck to move the patient support deck between a first vertical configuration and a second vertical configuration relative to the base;
a user interface configured to operate the patient support apparatus, the user interface comprising a screen coupled to the patient support deck for concurrent movement between the vertical configurations, the screen being configured to display visual content in a first content layout and in a second content layout different from the first content layout, the visual content comprising a first content portion and a second content portion different from the first content portion; and
a controller in communication with the screen and the lift mechanism, the controller configured to display the visual content in the second content layout when the patient support deck is in the second vertical configuration with the second content layout including the second content portion and the first content portion presented on the screen, and further configured to display the visual content in the first content layout when the patient support deck is in the first vertical configuration with the first content layout including the first content portion presented on the screen differently than in the second content layout and with the second content portion hidden in the first content layout to optimize visibility of the first content portion based on changes between the first vertical configuration and the second vertical configuration.

2. The patient support apparatus as set forth in claim 1, wherein the patient support deck is closer to the base in the first vertical configuration than in the second vertical configuration.

3. The patient support apparatus as set forth in claim 2, wherein the first content layout includes a first scaling factor associated with the first content portion, and the second content layout includes a second scaling factor associated with the first content portion, with the first scaling factor being greater than the second scaling factor to optimize visibility of the first content portion based on changes between the first vertical configuration and the second vertical configuration.

4. The patient support apparatus as set forth in claim 1, further comprising an input device in communication with the controller and configured to generate an input signal, the controller being configured to facilitate navigation of the visual content in response to receiving the input signal from the input device.

5. The patient support apparatus as set forth in claim 4, wherein the input device is operatively attached to the screen.

6. The patient support apparatus as set forth in claim 5, wherein the user interface and the input device comprise a touchscreen to display the visual content and to facilitate navigation of the visual content.

7. The patient support apparatus as set forth in claim 1, further comprising a lift sensor to determine movement of the patient support deck between the first vertical configuration and the second vertical configuration.

8. The patient support apparatus as set forth in claim 7, wherein the controller is in communication with the lift sensor and is configured to display the visual content in the first content layout when the lift sensor determines the patient support deck is in the first vertical configuration, and further configured to display the visual content in the second content layout when the lift sensor determines the patient support deck is in the second vertical configuration.

9. A patient support apparatus comprising:
a base;
a patient support deck operatively attached to the base and arranged for movement relative to the base;
a lift mechanism interposed between the base and the patient support deck to move the patient support deck between a first vertical configuration and a second vertical configuration relative to the base;
a user interface configured to operate the patient support apparatus, the user interface comprising a screen coupled to the patient support deck for concurrent movement between the vertical configurations, the screen being configured to display visual content in a first content layout and in a second content layout different from the first content layout, the visual content comprising a first content portion and a second content portion different from the first content portion; and
a controller in communication with the screen and the lift mechanism, the controller configured to display the visual content in the second content layout when the patient support deck is in the second vertical configuration with the second content layout including the second content portion and the first content portion presented on the screen, and further configured to display the visual content in the first content layout when the patient support deck is in the first vertical configuration with the first content layout including the first content portion presented on the screen differently than in the second content layout to optimize visibility of the first content portion based on changes between the first vertical configuration and the second vertical configuration.

10. The patient support apparatus as set forth in claim 9, wherein the patient support deck is closer to the base in the first vertical configuration than in the second vertical configuration.

11. The patient support apparatus as set forth in claim 10, wherein the first content layout includes a first scaling factor associated with the first content portion, and the second content layout includes a second scaling factor associated with the first content portion, with the first scaling factor being greater than the second scaling factor to optimize visibility of the first content portion based on changes between the first vertical configuration and the second vertical configuration.

12. The patient support apparatus as set forth in claim 9, further comprising an input device in communication with the controller and configured to generate an input signal, the controller being configured to facilitate navigation of the visual content in response to receiving the input signal from the input device.

13. The patient support apparatus as set forth in claim 12, wherein the input device is operatively attached to the screen; and
wherein the user interface and the input device comprise a touchscreen to display the visual content and to facilitate navigation of the visual content.

14. The patient support apparatus as set forth in claim 9, further comprising a lift sensor to determine movement of the patient support deck between the first vertical configuration and the second vertical configuration; and
wherein the controller is in communication with the lift sensor and is configured to display the visual content in the first content layout when the lift sensor determines the patient support deck is in the first vertical configuration, and further configured to display the visual content in the second content layout when the lift sensor determines the patient support deck is in the second vertical configuration.

* * * * *